United States Patent Office 3,475,163
Patented Oct. 28, 1969

3,475,163
EXTRACTION PROCESS FOR Ni, Cu, Cr AND Co
John D. Watson, Sr., and William A. Mod, Lake Jackson, Tex., and Fred N. Teumac, South Bend, Ind., assignors to The Dow Chemical Company, Midland, Mich., a corporation of Delaware
No Drawing. Continuation-in-part of application Ser. No. 528,828, Feb. 21, 1966. This application Dec.16, 1968, Ser. No. 784,244
Int. Cl. C22b 3/00; C01g 53/04, 3/02
U.S. Cl. 75—101                                    11 Claims

ABSTRACT OF THE DISCLOSURE

A method for the extraction of nickel, copper, chromium and cobalt metal values from ores containing their sulfide and/or their oxide and silicate salts comprising contacting said ores with an aqueous leach solution which contains polyalkylenepolyamines or polyalkylenimines, or mixtures thereof.

CROSS-REFERENCE TO RELATED APPLICATIONS

This is a continuation-in-part of application Ser. No. 528,828 filed Feb. 21, 1966 now abandoned.

BACKGROUND OF THE INVENTION

The art teaches a number of methods for the extraction of nickel, copper, chromium and cobalt metal values from their ores. The methods usually involve a leaching step in which the desired metal is extracted from the metal-bearing material and dissolved in the leach solution.

One such leaching process is the utilization of aqueous sulfuric acid to extract copper oxide from low grade copper oxide ores. While sulfuric acid is effective as a solvent, has a low cost and is relatively non-volatile, it does dissolve other metals, particularly iron, which creates problems of selectivity, i.e., purity of the resulting dissolved copper, and the corrosion of materials of construction. Hydrochloric acid is also used to extract copper oxide, but presents the additional problem of high volatility.

A well-known process for the treatment of nickeliferous ores is the Sherritt-Gordon process, which consists of digesting the ores with ammonium hydroxide under pressure and high temperature, and then using a solvent, such as organic esters of phosphoric acid, to extract and separate metal values from the ammonium leach solution.

SUMMARY OF THE INVENTION

The instant invention is a method for the extraction of nickel, copper, chromium and cobalt metal values from ores containing their sulfide and/or their oxide and silicate salts, said method comprising contacting the ore with an aqueous solution of a polyalkylenepolyamine or polyalkylenimine, or mixtures thereof, whereby the metal values are extracted.

The instant invention results in some surprising separations. For instance, copper oxide can be preferentially extracted from ores containing both copper oxide and nickel oxide, even where present in proportions as low as 0.10 percent. And nickel, copper, chromium and cobalt sulfides can be preferentially extracted from ores containing iron sulfides, even though iron sulfide is the most soluble in water.

Extractions can be effected by either adding an aqueous solution of a polyalkylenepolyamine or polyalkylenimine, or mixtures thereof (hereinafter collectively called "amines"), to a slurry of the metal ore, or by so-called "in situ leaching," i.e., pumping an aqueous solution of the electrolyte into the mineral containing ore deposit. The leaching solution so used should generally contain from about 0.1 to 50 weight percent of the amine, the remainder being essentially $H_2O$. The optimum concentration for the extraction of metal sulfides is about 1 weight percent. For the extraction of copper oxide, the amine solution should contain from about 2 to 4 or more grams of amine per gram of copper oxide present in the ore, preferably from about 2.5 to 3.5 grams. Excess may be added but is not more advantageous.

The metal values can then be recovered both directly from the aqueous phase, by, for instance, electrolysis, reduction with a reducing gas and other well-known chemical methods for recovering these particular metal values.

The extraction of nickel, copper, chromium and cobalt sulfides and/or oxides and silicates by the method of this invention can suitably occur from a pH of about 2 to about 12. It is to be noted that copper oxide is much more soluble at low pH values, and thus best results for its extraction are obtained at a pH of about 2 to 7, while NiO becomes more soluble as the pH increases above 7. The pH of the amine solution can be adjusted with an acid or a base. Preferable for such adjustments are the mineral acids, such as HCl and $H_2SO_4$, and bases such as NaOH and $NH_4OH$. Other pH adjustors are, for example, phosphoric acid and nitric acid.

The process of this invention is operable from about 0° C. to about the boiling point of the amine solution used. For the extraction of nickel, copper, chromium and cobalt sulfides, a temperature of 0° to 40° C. is suitable, and a temperature of 10° to 30° C. is preferred. For the extraction of copper oxide, a temperature of from about 25° to 100° C. is preferred.

Water-soluble polyalkylenepolyamines (PAPA) and polyalkylenimines (PAI) in general are effective in the process of this invention. PAPA or PAI having higher nitrogen to carbon ratios are the most effective, that is, polyethylenimine is more effective than polypropylenimine.

If polyethylenimine (PEI) is employed in the present invention, it may be prepared by the polymerization of ethylenimine. Methods for such polymerization are known in the art, and are reviewed by Jones, "Polymerization of Olefin Imines," in Plesch, ed., The Chemistry of Cationic Polymerization (New York, MacMillan, 1963), pages 521 to 534. The molecular weight of the PEI is not critical, but the difficulty of handling extremely viscous polymer solutions makes very high molecular weight PEI less desirable. The PEI utilized in this invention may range from the dimers, trimers, and tetramers to PEI having an average molecular weight of 100,000 or more. The upper limit of the molecular weight is determined solely by the water solubility and viscosity of the PEI.

Lower molecular weight PAPA and PAI, such as dimers, trimers and teramers, give a performance equivalent to higher molecular weight PAPA or PAI but with shorter reaction time. The lower molecular weight PAI or PAPA are commercially available. Mixtures of PAPA and/or PAI are also operable in the process of this invention.

It is to be noted, particularly from Example 11, that the addition of air to the ore/aqueous amine can increase the weight percent extracted in a dramatic fashion. Air can be bubbled, for instance, through the slurry while digesting in the extraction solution.

SPECIFIC EXAMPLES

Example 1

The solubility of copper oxide in a 5 percent by weight aqueous solution of PEI having a molecular weight generally above 100,000 was evaluated at varying pH values and temperatures. The pH was adjusted with aqueous HCl. The results show that copper oxide is much more soluble at lower pH values and its solubility increases with temperature in the range evaluated. The results obtained are listed below in Table I, expressed as grams of copper oxide solubilized per gram of PEI in the leach solution.

TABLE I

|  | pH | | |
|---|---|---|---|
|  | 8.2 | 7.0 | 5.5 |
|  | Grams | CuO/ Gram | PEI |
| Temperature, °C.: | | | |
| 25 | 0.25 | 0.85 | 0.91 |
| 52 | 0.38 | 0.59 | 0.78 |
| 70 | 0.41 | 0.97 | 1.09 |

Example 2

One gram each of powdered nickel oxide and copper oxide were thoroughly mixed and added to a beaker. A solution of 2 grams of triethylenetetramine (TETA) and 2.71 grams of a 37 percent by weight solution of HCl was made up to 50 cc. with water and added to the beaker. The resulting mixture had a pH of 8.7. The contents were continuously agitated for 24 hours. Analysis of the liquid product by emission spectrography indicated that 72 percent by weight of the copper oxide had been removed, but only 1.1 percent by weight of the nickel oxide had been removed.

Example 3

Separation of copper from a mixture containing by weight 1.3 percent copper oxide, 97.9 percent nickel oxide, and 0.8 percent $Fe_2O_3$ with an aqueous solution containing one percent by weight of polyethylenimine (PEI), having an average molecular weight above 100,000, was investigated over a pH range of about 2.5 to 10.2. About 90 percent of the copper and only one percent of the nickel was removed over a 72-hour period at pH 2.5. The residue of the mixture analyzed 0.16 weight percent copper. TETA gave similar results to those obtained with PEI except that equivalent results were obtained in 24 hours. A weight ratio of TETA to copper in the leach solution of 1.67 was obtained.

Example 4

The effect of temperature and the effect of the present method on iron were evaluated by making two identical runs with temperature as the only variable. A quantity of 9 grams of NiO, 0.5 gram of CuO, and 0.5 gram of $Fe_2O_3$ were thoroughly mixed and added to a beaker. Aqueous solutions containing one gram of TETA and 2.71 grams of 37 weight percent aqueous HCl were made up to 50 cc. with water and added to each beaker. These solutions had a pH of 2.6. Both were constantly agitated for 24 hours. One solution was kept at room temperature and the other maintained near the boiling point (95° C.). The same sequence of operations was repeated with one gram of 98–99 weight percent aqueous $H_2SO_4$ substituted for the HCl, giving the resulting solutions a pH of 4.5. The results of these runs are shown in Table II.

Example 5

Runs were made using aqueous solutions containing the polyalkylenepolyamines (PAPA) without the addition of acid. Ten grams of a mixture consisting of 97.9 weight percent NiO, 1.3 weight percent CuO, and 0.8 weight percent $Fe_2O_3$ were added to a beaker. Two grams of TETA were added to sufficient water to give a 100 cc. solution and added to the mixture. This mixture had a pH of about 11.2. The resulting mixture was constantly agitated for four days. An analysis of the liquids showed that 66 percent of the CuO was removed while only about one percent of the NiO was removed. No iron was detected in the liquid.

Two grams of a mixture consisting of, by weight, 90 percent NiO, 5 percent CuO, and 5 percent $Fe_2O_3$ was added to a beaker. A solution of 2 grams of pentaethylenehexamine (PEHA) in sufficient water to make up to 100 cc. was added to the mixture. This mixture had a pH of about 11.5. The resulting mixture was agitated constantly for three days at room temperature. An analysis of the liquid showed that 70 percent of the CuO was removed and less than one percent of the nickel and iron oxides was removed.

Example 6

To test the effect of PAPA solutions on copper ore, 10 grams of a copper laterite ore containing 0.8 weight percent copper as copper oxide was placed in a beaker with 2 grams of TETA in 100 cc. of water. The mixture had a pH of 11.0. This mixture was agitated for 4 days at room temperature. An analysis showed that 56.5 percent of the copper was extracted from the ore.

Example 7

A quantity of 77 grams of NiO and one gram of CuO were thoroughly mixed and added to a large flask. A one percent solution in water of PEI having an average molecular weight above 100,000 was acidified with HCl to a pH or 4. One liter of this solution was added to the solids and the resulting mixture agitated for 24 hours at room temperature. An analysis of the liquids showed that 75 percent of the copper oxide was removed while only 1.2 percent of the NiO was removed.

Example 8

Five grams of a nickeliferous laterite ore (Red Mountain ore) pulverized to less than 100 mesh was mixed with 100 ml. of a 2 percent solution of PEHA solution, continuously agitated, pH adjusted to about 2.0 using concentrated HCl, and digested at about 24° C. for 72 hours. At the end of this time, the aqueous solution was separated from the solids and analyzed for nickel, copper, iron, chromium and cobalt. The analysis of the ore, and the results of the extraction are shown below.

Analysis of Red Mountain Ore (nickeliferous laterite):

|  | Percent |
|---|---|
| $Fe_2O_3$ | 54.9 |
| $SiO_2$ | 16.1 |
| Mgo | 6.2 |
| $Al_2O_3$ | 3.4 |

| Present as oxides and silicates: | Percent |
|---|---|
| Cr | 1.7 |
| Ni | 1.0 |
| Mn | 0.5 |
| Co | 0.14 |

TABLE II

| | Temperature | Percent CuO Removed | Percent NiO Removed | Percent $Fe_2O_3$ Removed | (Weight Fe removed/Weight Cu Removed) |
|---|---|---|---|---|---|
| Acid Addition: | | | | | |
| HCl | Room | 50 | 0.29 | 0.6 | 0.004 |
| HCl | 95° C | 100 | 1.50 | 0.9 | 0.002 |
| $H_2SO_4$ | Room | 53 | 0.23 | 0.7 | 0.004 |
| $H_2SO_4$ | 95° C | 100 | 10.0 | 0.4 | 0.001 |

Also trace amounts of Ca, Ti, V, Zn, and Cu values.

weight percent of metal extracted. In all the runs, agitation was employed throughout the treating steps.

TABLE III

| Run No. | Parts of Ore Treated | Extracting Solution Used | Temp., °C. | Time in Hours | Air Added | Percent of Metal Extracted | | | |
|---|---|---|---|---|---|---|---|---|---|
| | | | | | | Fe | Co | Cu | Ni |
| 1 | 5 | 100 parts of 1% TETA | 23 | 120 | Yes | <0.04 | >90 | 14.3 | 39.2 |
| 2 | 5 | 100 parts of 1% TETA | 23 | 168 | Yes | <0.04 | 100 | 21.4 | 42.8 |
| 3 | 5 | 100 parts of 1% TETA | 23 | 120 | No | <0.04 | <20 | <3.0 | 1.18 |
| 4 | 5 | 100 parts of 1% TETA | 23 | 140 | No | <0.04 | <20 | <3.0 | 1.18 |
| 5 | 5 | 100 parts of 2% TETA | 23 | 120 | No | <0.04 | <20 | <3.0 | 1.25 |
| 6 | 5 | 200 parts of 1% TETA | 23 | 86 | Yes | <0.04 | >44 | 20.0 | 71.5 |
| 7 | 5 | 100 parts of 2% TETA | 23 | 86 | Yes | <0.04 | 25 | 20.0 | 50.0 |
| 8 | 5 | 200 parts of 1% PEHA | 23 | 86 | Yes | <0.04 | 25 | 4.0 | 57.0 |
| 9 | 20 | 500 parts of 2% TETA | 70–73 | 24 | Yes | <0.05 | >50 | 43.0 | 89.0 |
| 10 | 20 | 500 parts of 2% TETA | 70–73 | 48 | Yes | <0.05 | >53 | 55.0 | 100.0 |
| 11 | 50 | 500 parts of 5% TETA | 90 | 18 | Yes | <0.02 | >6 | 1.14 | 14.3 |
| 12 | 50 | 500 parts of 5% TETA | 90 | 32 | Yes | <0.02 | >11 | 6.0 | 37.4 |
| 13 | 20 | 500 parts of 1% TETA | 80 | 23 | Yes | <0.05 | >37 | 32.0 | 67.0 |
| 14 | 20 | 500 parts of 1% PEHA | 80 | 24 | Yes | <0.05 | >81 | 14.0 | 31.0 |
| 15 | 20 | 500 parts of 1% TETA containing 0.5% NaOH | 83 | 24 | Yes | <0.05 | <28 | 0.7 | 35.8 |
| 16 | 20 | 500 parts of 1% TETA | 80 | 52 | Yes | <0.05 | >25 | 15.0 | 40.0 |
| 17 | 20 | 500 parts of 1% DETA [1] | 78 | 24 | Yes | <0.05 | >56 | 36.0 | 71.0 |
| 18 | 20 | 500 parts of 1% DETA | 78 | 48 | Yes | <0.05 | >40 | 25.0 | 75.0 |

[1] Diethylenetriamine.

The remainder was unidentified combustible or vaporizable material.

| Amount in the ore, calculated from the above ore analysis | Amount found by analysis in the aqueous phase | Percent (by weight) extracted |
|---|---|---|
| Ni, 0.05 grams | Ni, .003 grams | 6 |
| Co, 0.007 grams | Co, .006 grams | 86 |
| Fe, 1.75 grams | Fe, .029 grams | 1.65 |
| Cr, 0.085 grams | Cr, .04 grams | 47 |
| Cu, Trace | Cu, Trace | |

Example 9

Example 8 was repeated except that the pH of the electrolytic solution was adjusted with NaOH pellets to the adjusted pH of between about 11.0 and 12.0. The results are shown below:

Amount found by analysis in the aqueous phase: / Percent (by weight) Extracted

Ni<.001 gm. — <2
Co<.002 gm. — <3
Fe<.0025 gm. — <0.2
Cr .04 gm. — 47
Cu trace. — —

Example 10

Ten grams of pulverized Pentlandite ore (ca 70–150 mesh) was mixed with 50 ml. of 1 percent TETA solution. The mixture was agitated at about 24° C. for 72 hours with samplings taken every 24 hours for analysis of cobalt, copper, nickel and iron. The results are shown below:

| Amount put into aqueous mixture (calc. from ore anal.) | Amount found in Aqueous Phase Calc. from analysis of samplings | | | Percent extracted after 72 hrs. |
|---|---|---|---|---|
| | 24 hrs. | 48 hrs. | 72 hrs. | |
| Co, .008 gram | N/A | .0013 | .0013 | 14.2% |
| Cu, .102 gram | .0037 | .008 | .055 | 53.9% |
| Ni, .56 gram | .034 | .058 | .105 | 18.7% |
| Fe, 4.8 grams | <.00025 | <.00025 | <.00025 | <.005% |

Example 11

A series of experiments was made to extract nickel, copper and cobalt from a Pentlandite ore. The ore was analyzed and found to contain the following percentages of metals: Nickel, 5.6%; Cobalt, less than 0.2%; Copper, 0.7%; Iron, 50%. The ore was pulverized and screened through a 100 mesh screen. In some of the experiments air was bubbled through the slurry formed by mixing the ore with the aqueous amine solution. The following table shows the conditions employed in the experiments and the

What is claimed is:

1. A process for the chemical extraction of nickel, copper, chromium and cobalt metal values from ores containing their sulfide and/or their oxide and silicate salts, comprising contacting said ore with an aqueous solution of a polyalkylenepolyamine or polyalkylenimine, or a mixture thereof.

2. The process of claim 1 wherein the polyalkylenepolyamine is diethylenetriamine, triethylenetetramine or pentaethylenehexamine.

3. The process of claim 1 wherein air is contacted with the ore during extraction.

4. The process of claim 1 wherein the pH is adjusted to about 2 to 12 with an acid or a base.

5. The process of claim 1 wherein the aqueous solution consists essentially of water and from 0.10 to 50.0 weight percent polyalkylenepolyamine or polyalkylenimine, or mixtures thereof.

6. The process of claim 1 wherein the polyalkylenimine is polyethylenimine or polypropylenimine.

7. A process for the chemical extraction of copper oxide from a copper oxide-containing mineral mixture which comprises contacting said mixture with a leaching solution consisting essentially of water and at least about one percent by weight, based on the solution, of a water-soluble polyalkylenepolyamine or polyalkylenimine or a mixture thereof.

8. The process of claim 7 wherein the polyalkylenepolyamine is diethylenetriamine, triethylenetetramine or pentaethylenehexamine.

9. The process of claim 7 wherein the polyalkylenimine is polyethylenimine or polypropylenimine.

10. The process of claim 7 wherein the polyalkylenepolyamine is triethylenetetramine or pentaethylenehexamine, and the pH of its aqueous solution is adjusted to about 2 to about 7 with a mineral acid.

11. The process of claim 7 wherein the polyalkylenimine is polyethylenimine having an average molecular weight of 100,000 or more, and the pH of its aqueous solution is adjusted to about 2 to about 7 with a mineral acid.

References Cited

UNITED STATES PATENTS 2,839,387  6/1958  Burton _____ 75—105
2,950,964  8/1960  Forward et al. _____ 75—103
3,201,334  8/1965  Ben-Bassat _____ 75—117

L. DEWAYNE RUTLEDGE, Primary Examiner

T. R. FRYE, Assistant Examiner

U.S. Cl. X.R.

75—103, 117; 23—55